United States Patent
Sun et al.

(10) Patent No.: US 6,623,029 B2
(45) Date of Patent: Sep. 23, 2003

(54) SEAMLESS PASSENGER SIDE AIRBAG DOOR ON HARD INSTRUMENT PANEL

(75) Inventors: Esther M. Sun, Novi, MI (US); James D. Pink, Sterling Heights, MI (US); Sirish Mishra, Troy, MI (US); Anna H. Cardenas, Allen Park, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/948,962

(22) Filed: Sep. 7, 2001

(65) Prior Publication Data

US 2003/0047915 A1 Mar. 13, 2003

(51) Int. Cl.[7] .......................... B60R 21/20; B60R 21/22
(52) U.S. Cl. .................. 280/728.2; 280/728.3; 280/732
(58) Field of Search .................. 280/728.3, 732, 280/728.2, 730.1, 752

(56) References Cited

U.S. PATENT DOCUMENTS

| | | | |
|---|---|---|---|
| 5,280,947 A | 1/1994 | Cooper | |
| 5,372,379 A | 12/1994 | Parker | |
| 5,435,596 A | 7/1995 | Rose et al. | |
| 5,437,469 A | 8/1995 | Monden | |
| 5,456,487 A | * 10/1995 | Daris et al. | 280/728.3 |
| 5,803,489 A | 9/1998 | Nusshör | |
| 5,845,931 A | 12/1998 | Nagy et al. | |
| 6,045,153 A | 4/2000 | Sommer et al. | |
| 6,076,851 A | 6/2000 | Davis, Jr. et al. | |
| 6,318,752 B1 | * 11/2001 | Warnecke et al. | 280/728.3 |
| 6,378,894 B1 | * 4/2002 | Trevino et al. | 280/728.3 |
| 6,467,800 B1 | * 10/2002 | Bey et al. | 280/728.3 |
| 2001/0045728 A1 | * 11/2001 | Kansteiner et al. | 280/728.3 |
| 2002/0003343 A1 | * 1/2002 | Kansteiner | 280/728.3 |
| 2002/0005630 A1 | * 1/2002 | Suzuki et al. | 280/728.3 |

FOREIGN PATENT DOCUMENTS

| | | | | |
|---|---|---|---|---|
| JP | 5-185896 | * | 7/1993 | 280/752 |
| WO | WO 9947386 A1 | * | 9/1999 | B60R/21/20 |
| WO | 02/47943 | * | 6/2002 | |

* cited by examiner

*Primary Examiner*—Peter C. English
(74) *Attorney, Agent, or Firm*—Brinks Hofer Gilson & Lione

(57) ABSTRACT

An instrument panel for an automobile passenger compartment comprises a substrate with an interior surface and an exterior surface. A pre-weakened outline is formed within the interior surface and defines a panel door. A chute is mounted to the interior surface and includes a front surface and an opening extending therethrough. The front surface includes a plurality of welding ribs adapted for vibration welding to the interior surface. A metal door includes a hinge portion and a door portion. The hinge portion is attached to the chute and the door portion is pivotally attached to the hinge portion and further attached to the panel door. An air bag module is mounted to the chute. The opening within the chute is smaller than the panel door such that the pre-weakened outline within the interior surface is supported by the front surface when the chute is mounted to the interior surface.

20 Claims, 3 Drawing Sheets

US 6,623,029 B2

SEAMLESS PASSENGER SIDE AIRBAG DOOR ON HARD INSTRUMENT PANEL

TECHNICAL FIELD OF THE INVENTION

This patent discloses and claims a useful, novel, and unobvious invention for an automobile instrument panel, including an air bag device and a seamless outer cover.

BACKGROUND

One issue that has recently been a concern with air bag devices installed in automobiles is that the air bag must preserve the aesthetic appeal of the automobile, but at the same time, deploy outward through the instrument panel with minimal interference. In a hard molded instrument panel, the air bag must be able to break through the instrument panel, but the instrument panel itself must be structurally sound and resistant to inadvertent fracturing at or near the point where the air bag is meant to deploy. For this reason, there is a need in the industry for continuous improvements on an air bag door in a hard molded instrument panel.

SUMMARY OF THE INVENTION

In accordance with an aspect of the present invention an instrument panel for an automobile passenger compartment includes a substrate with an interior surface and an exterior surface. A pre-weakened outline is formed within the interior surface and defines a panel door within the substrate. A chute is mounted to the interior surface and includes a front surface with an opening extending therethrough, wherein the front surface extends around the opening. The opening within the chute is smaller than the pre-weakened outline defining the panel door such that the pre-weakened outline is covered by the front surface of the chute when the chute is mounted to the interior surface.

DETAILED DESCRIPTION OF THE PREFERRED EMBODIMENT

The following description of this preferred embodiment of the invention is not intended to limit the scope of the invention to these preferred embodiments, but rather to enable any person skilled in the art to make and use the invention.

Figure 1:
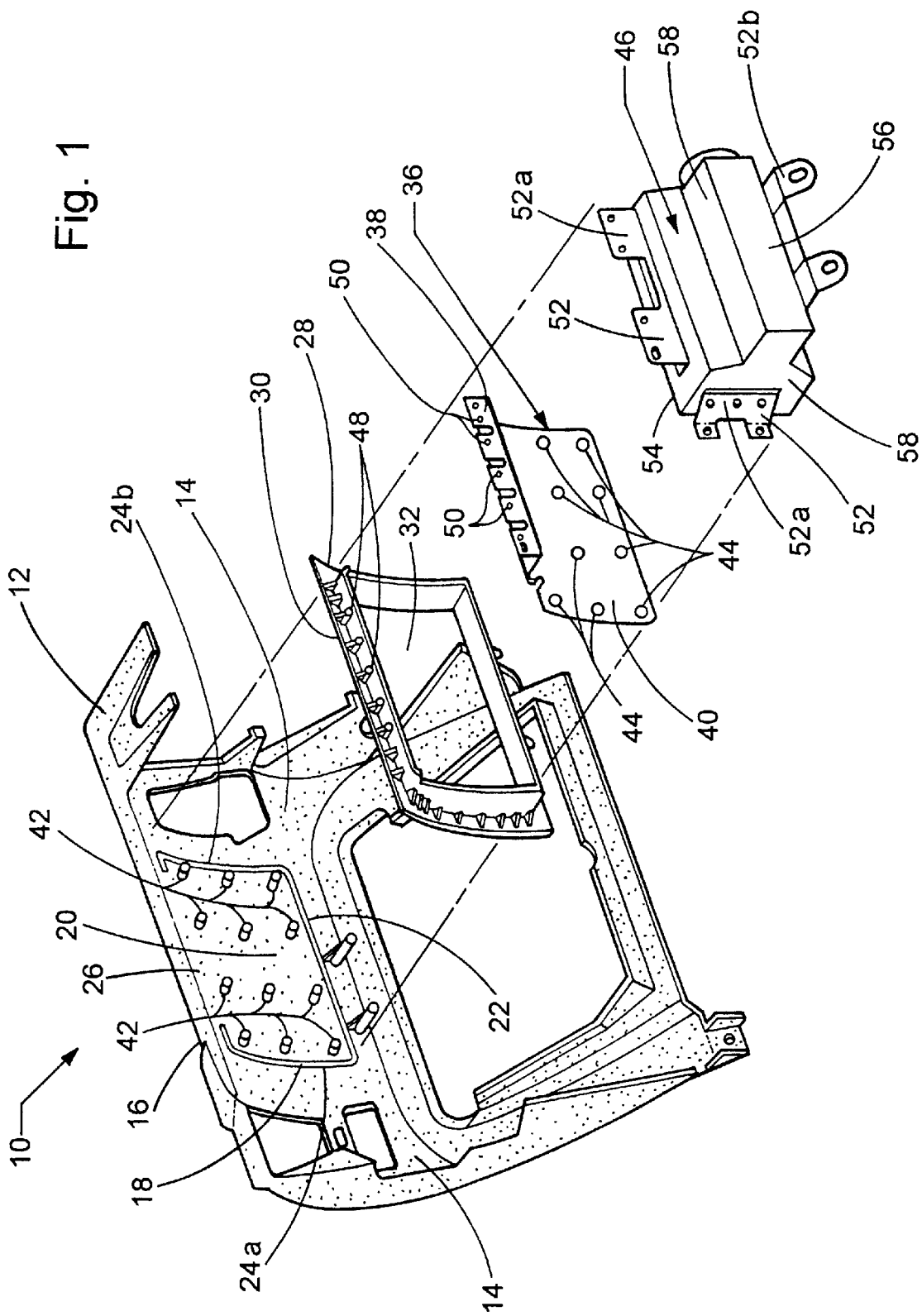
FIG. 1 is an exploded view of an instrument panel incorporating an air bag door of the present invention.
Figure 3:
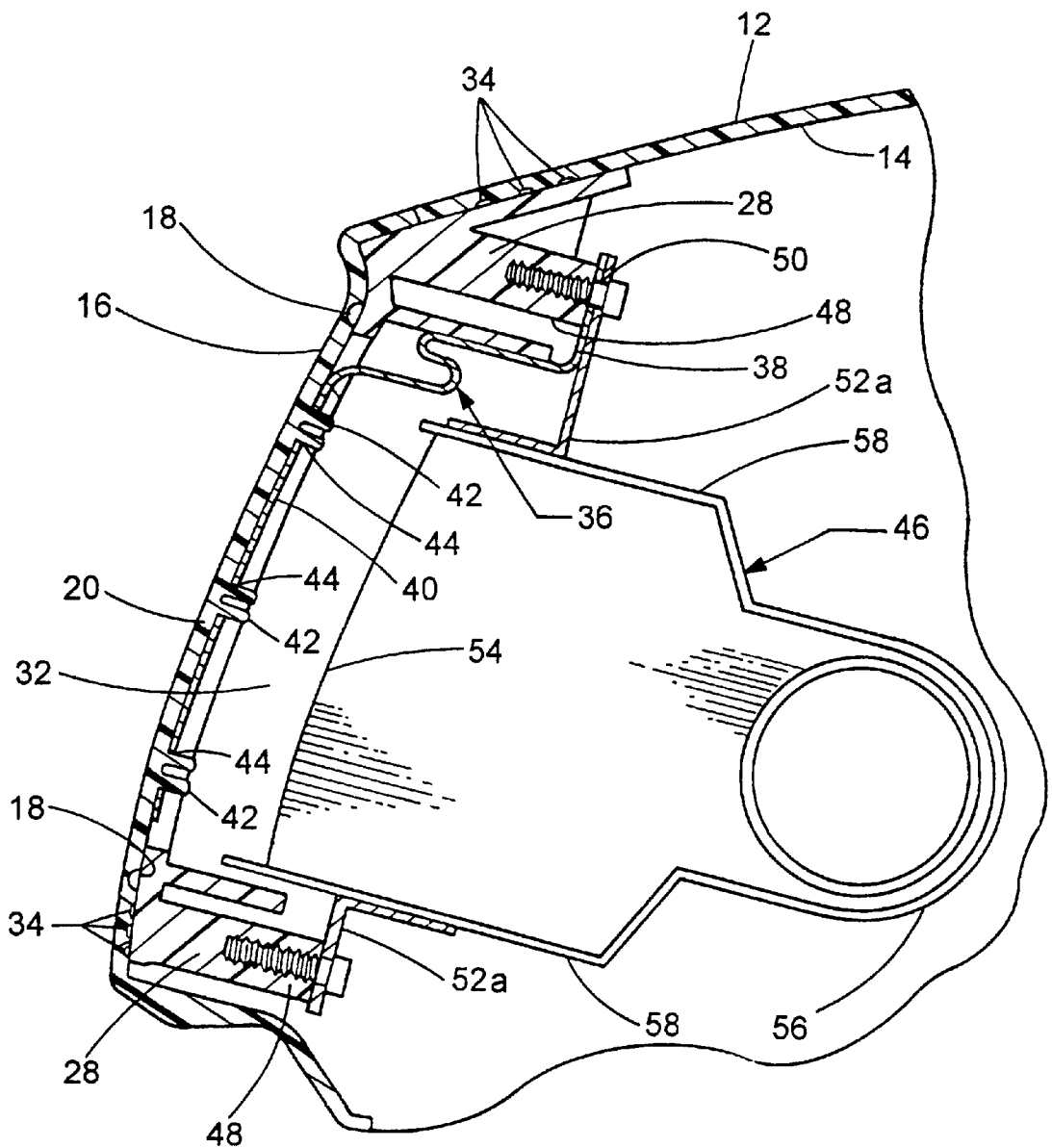
FIG. 3 is a side sectional view of an instrument panel incorporating the air bag door.

Referring to FIGS. 1 and 3, an instrument panel for an automobile passenger compartment is generally shown at 10. The instrument panel includes a substrate 12 including an interior surface 14 and an exterior surface 16. Preferably, the substrate 12 is formed from molded-in-color hard polypropylene, however it is to be understood that the substrate 12 could comprise other suitable materials. The exterior surface 16 of the substrate 12 faces into the interior of the vehicle, and the interior surface 14 of the substrate 12 faces away from the interior of the vehicle. The exterior surface 16 is preferably molded to the color and texture specifications required by the vehicle to allow the substrate 12 to present a cosmetically acceptable instrument panel 10 to the interior of the vehicle. In typical instrument panel assemblies, a skin covering is placed on the exterior of a substrate to present a suitable appearance to the interior of the vehicle. With the molded-in-color substrate 12 of the present invention, the need for a skin covering is eliminated.

The interior surface 14 of the substrate includes a pre-weakened outline 18 formed therein which defines a panel door 20 within the substrate 12. The pre-weakened outline 18 preferably extends in a generally three sided shape to define the bottom edge 22 and two sides 24a, 24b of the panel door 20. The pre-weakened outline 18 allows the substrate 12 to maintain structural integrity and appearance while providing a weakened outline that will break away under the pressure of the deploying airbag. When the air bag is deployed, the force is sufficient to break the panel door 20 away from the remaining portion of the substrate 12 along the pre-weakened outline 18.

The pre-weakened outline 18 preferably does not extend across a top edge 26 of the panel door 20 so that the substrate 12 will remain in tact along the top edge 26 to help keep the panel door 20 attached to the substrate 12 when the air bag explodes through the panel door 20.

The pre-weakened outline 18 within the interior surface 14 of the substrate 12 can be formed by many methods, however, in the preferred embodiment, the pre-weakened outline 18 is formed by laser scoring the interior surface 14 of the substrate 12. By appropriately selecting and controlling the laser, a cut can be made within the interior surface 14 which extends into the substrate 12. Preferably, the cut is deep enough to weaken the substrate 12, but not deep enough to compromise the structural integrity of the substrate 12 under normal operating conditions. Additionally, the cut preferably does not provide any visible indication on the exterior surface 16 of the substrate 12 that the pre-weakened outline 18 is present.

A chute 28 is mounted to the interior surface 14 of the substrate 12. The chute 28 includes a front surface 30 and an opening 32 extending therethrough. The front surface 30 extends around the opening 32 within the chute 28. The chute 28 can be injection molded from the same molded-in-color polypropylene material as the substrate 12, or alternatively, the chute 28 can be injection molded from a material that is harder than the substrate 12 such as rubber filled polypropylene or glass filled polypropylene. Depending on the application, the chute 28 can be formed from any suitable material.

The chute 28 is mounted to the interior surface 14 of the substrate 12 that the opening 32 within the chute 28 is aligned with the panel door 20. The opening 32 within the chute 28 is smaller than the pre-weakened outline 18 defining the panel door 20, so that when the chute 28 is mounted to the interior surface 14, the front surface 30 of the chute 28 will overlap the pre-weakened outline 18. This provides support to prevent the panel door 20 from being inadvertently pushed into the instrument panel 10 from within the vehicle. This is applicable when the instrument panel 10 is exposed to high impact forces, such as in a head on collision where the passenger's head or hands may impact the instrument panel 10 with very high force. The pre-weakened outline 18 would make the panel door 20 susceptible to breaking away from this type of high pressure exerted on the exterior surface 16 of the substrate 12, however, when the chute 28 is attached to the interior surface 14, the front surface 30 overlaps the pre-weakened outline 18 providing a structure to support the panel door 20.

Figure 2:
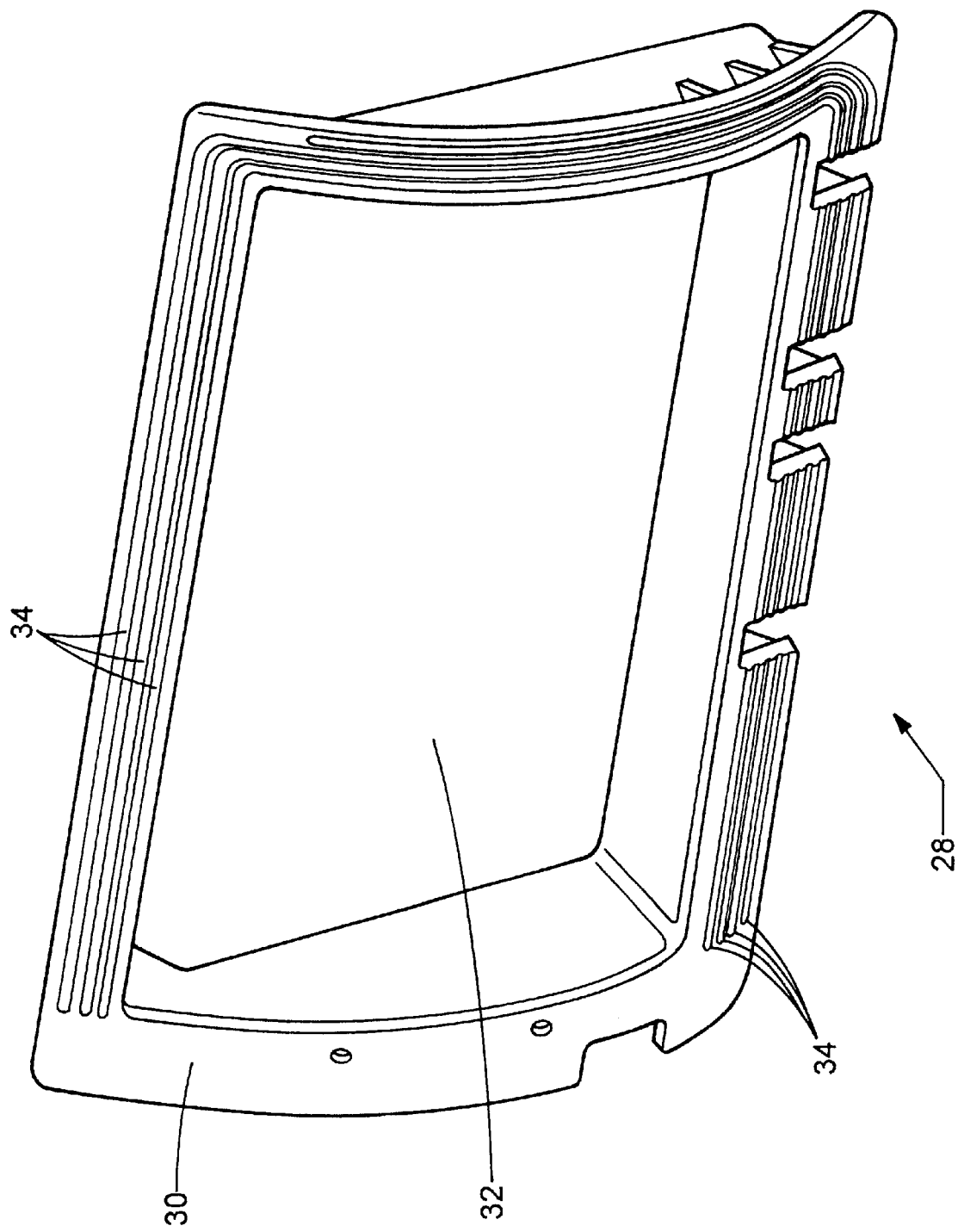
FIG. 2 is a perspective view of a chute of the present invention.

Referring to FIG. 2, the front surface 30 of the chute 28 further includes a plurality of welding ribs 34 formed on the front surface 30. The welding ribs 34 are adapted to allow the chute 28 to be vibration welded to the interior surface 14 of the substrate 12. In the preferred embodiment, the welding ribs 34 extend parallel to each other around the opening 32 within the chute 28. It is to be understood, that the welding ribs 34 could have alternative orientations such as where the welding ribs 34 extend away from the opening 32 or cross each other in a grid formation.

Preferably, the instrument panel 10 further includes a metal door 36 mounted to the chute 28 and to the panel door 20. The metal door 36 includes a hinge portion 38 and a door portion 40. The hinge portion 38 is attached to the chute 28. The door portion 40 is pivotally attached to the hinge portion 38, and further attached to the panel door 20. The metal door 36 is adapted to strengthen the panel door 20 and to provide a hinge for the panel door 20.

The interior surface 14 of the substrate 12 defined as the panel door 20 includes molded in bosses 42 that extend outward from the interior surface 14. The metal door 36 includes apertures 44 that are adapted to receive the molded in bosses 42. The molded in bosses 42 are adapted to fit within the apertures 44 within the metal door 36 so that the bosses 42 can be heat staked to secure the metal door 36 to the interior surface 14 of the panel door 20. This will provide additional structural support for the panel door 20, as well as providing a metal hinge.

An air bag module 46 is mounted to the chute 28. The chute 28 includes molded in bosses 48 which are adapted to receive fasteners to secure the air bag module 46 to the chute 28. The hinge portion 38 of the metal door 36 includes apertures 50 adapted to receive fasteners therethrough so that the hinge portion 38 of the metal door 36 is sandwiched between the molded in bosses 48 of the chute 28 and the air bag module 46.

Preferably, the air bag module 46 includes a plurality of mounting brackets 52 that are adapted to mount the air bag module to the chute 28. Additionally, the air bag module 46 preferably includes at least one bracket 52 adapted to mount the air bag module 46 to a support structure within the automobile. By mounting the air bag module 46 to the instrument panel 10 and to a support structure within the vehicle, the instrument panel 10 is supported by the support structure of the vehicle through the chute 28 and the air bag module 46.

Preferably, the air bag module 46 includes a front end 54, a rear end 56, four sides 58, four side mounting brackets 52a and a rear mounting bracket 52b. One side mounting bracket 52a is attached to each of the four sides 58, and is adapted to receive fasteners to attach the bracket 52a to the bosses 48 formed within the chute 28. The rear mounting bracket 52b extends from the rear end 56, and is adapted to receive fasteners to attach to a support structure within the automobile, such as a cross car beam. Preferably, the rear mounting bracket 52b includes a closed slot for attachment to the cross car beam such that under sufficient impact, the air bag module 46 can move relative to the cross car beam thereby allowing the air bag module 46 to absorb energy during a severe impact.

The foregoing discussion discloses and describes one preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. An instrument panel for an automobile passenger compartment comprising;
   a substrate including an interior surface and an exterior surface;
   a pre-weakened outline formed within said interior surface defining a panel door within said substrate;
   a chute mounted to said interior surface and including a front surface and an opening therein, said front surface extending around said opening;
   said opening within said chute being smaller than said panel door such that said pre-weakened outline within said interior surface is supported by said front surface of said chute when said chute is mounted to said interior surface; and
   a metal door including a hinge portion and a door portion, said hinge portion attached to said chute and said door portion pivotally attached to said hinge portion and attached to said panel door, said metal door adapted to strengthen said panel door and to provide a hinge for said panel door;
   said chute including molded-in bosses adapted to receive threaded fasteners to support said metal door and an air bag module thereon.

2. The instrument panel as set forth in claim 1 further including an air bag module mounted to said chute, said hinge portion of said metal door being disposed between said chute and said air bag module.

3. The instrument panel as set forth in claim 2 wherein said air bag module includes a plurality of mounting brackets adapted to mount said air bag module to said chute and to mount said air bag module to a support structure within the automobile, thereby providing attachment of the instrument panel back to the support structure of the automobile through said chute and air bag module.

4. The instrument panel as set forth in claim 3 wherein said air bag module includes a front end, a rear end, four sides, one side mounting bracket attached to each of said four sides and adapted for attachment to said chute, and a rear mounting bracket extending from said rear end and adapted to attach to the support structure of the automobile.

5. The instrument panel as set forth in claim 1 wherein said interior surface includes molded-in bosses and said metal door includes apertures adapted to receive said molded-in bosses to allow said metal door to be heat staked to said interior surface.

6. The instrument panel as set forth in claim 1 wherein said front surface of said chute includes a plurality of welding ribs adapted for vibration welding to said interior surface.

7. The instrument panel as set forth in claim 6 wherein said plurality of welding ribs extend parallel to each other around said opening within said chute.

8. The instrument panel as set forth in claim 1 wherein said instrument panel is formed from molded-in-color polypropylene.

9. The instrument panel as set forth in claim 1 wherein said pro-weakened outline within said interior surface is a laser scored line.

10. The instrument panel as set forth in claim 1 wherein said chute is injection molded from the same molded-in-color polypropylene material as said substrate.

11. The instrument panel as set forth in claim 1 wherein said chute is injection molded from a material that is harder than said substrate.

12. An instrument panel for an automobile passenger compartment comprising;
   a substrate including an interior surface and an exterior surface;
   a pre-weakened outline formed within said interior surface defining a panel door within said substrate;
   a chute mounted to said interior surface and including a front surface and an opening therein, said front surface extending around said opening and including a plurality of welding ribs adapted for vibration welding to said interior surface;
   a metal door including a hinge portion and a door portion, said hinge portion attached to said chute and said door portion pivotally attached to said hinge portion and attached to said panel door, said metal door adapted to strengthen said panel door and to provide a hinge for said panel door; and
   an air bag module mounted to said chute, said hinge portion of said metal door being disposed between said chute and said air bag module;
   said opening within said chute being smaller than said panel door such that said pre-weakened outline within said interior surface is covered by said front surface of said chute when said chute is mounted to said interior surface;
   said chute including molded-in bosses adapted to receive threaded fasteners and to support said metal door and said air bag module.

13. The instrument panel as set forth in claim 12 wherein said air bag module includes a plurality of mounting brackets adapted to mount said air bag module to said chute and to mount said air bag module to a support structure within the automobile, thereby providing attachment of the instrument panel back to the support structure of the automobile through said chute and air bag module.

14. The instrument panel as set forth in claim 13 wherein said air bag module includes a front end, a rear end, four sides, one side mounting bracket attached to each of said four sides and adapted for attachment to said chute, and a rear mounting bracket extending from said rear end and adapted to attach to the support structure of the automobile.

15. The instrument panel as set forth in claim 12 wherein said interior surface includes molded-in bosses and said metal door includes apertures adapted to receive said molded-in bosses to allow said metal door to be heat staked to said interior surface.

16. The instrument panel as set forth in claim 12 wherein said plurality of welding ribs extend parallel to each other around said opening within said chute.

17. The instrument panel as set forth in claim 12 wherein said instrument panel is formed from molded-in-color polypropylene.

18. The instrument panel as set forth in claim 12 wherein said pre-weakened outline within said interior surface is a laser scored line.

19. The instrument panel as set forth in claim 12 wherein said chute is injection molded from the same molded-in-color polypropylene material as said-substrate.

20. The instrument panel as set forth in claim 12 wherein said chute is injection molded from a material that is harder than said substrate.

* * * * *

UNITED STATES PATENT AND TRADEMARK OFFICE
CERTIFICATE OF CORRECTION

PATENT NO.    : 6,623,029 B2  
DATED         : September 23, 2003  
INVENTOR(S)   : Esther M. Sun et al.

It is certified that error appears in the above-identified patent and that said Letters Patent is hereby corrected as shown below:

<u>Column 4,</u>  
Line 62, delete "pro-weakened" and substitute -- pre-weakened -- in its place.

<u>Column 6,</u>  
Line 28, delete "said-substrate" and substitute -- said substrate -- in its place.

Signed and Sealed this

Thirteenth Day of January, 2004

JON W. DUDAS  
*Acting Director of the United States Patent and Trademark Office*